March 26, 1957 M. A. THORNE 2,786,725
ENDLESS TRACK STRUCTURES FOR VEHICLES
Filed Feb. 8, 1952 4 Sheets-Sheet 1
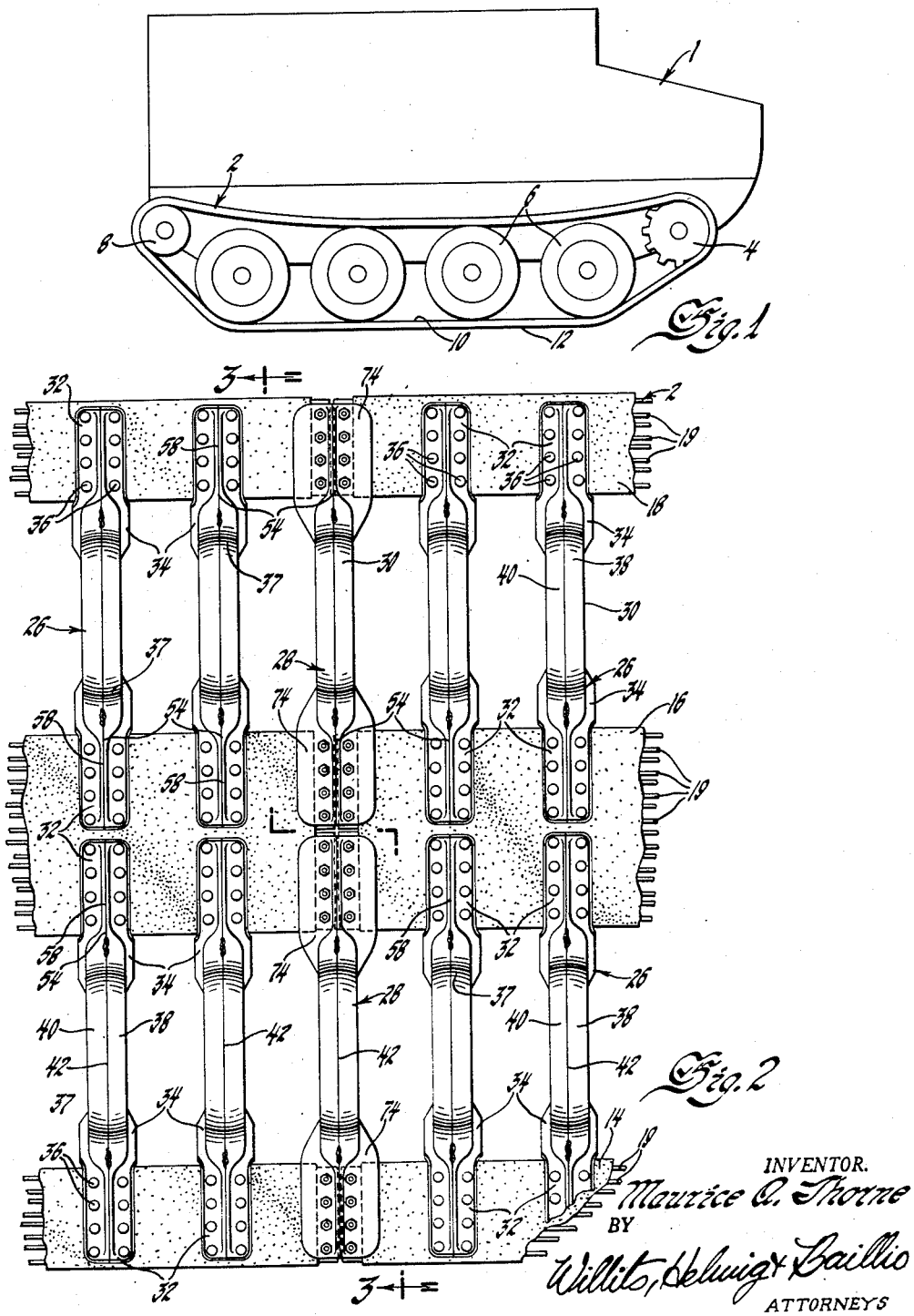
INVENTOR.
Maurice A. Thorne
BY
Willits, Helmig & Baillio
ATTORNEYS March 26, 1957  M. A. THORNE  2,786,725
ENDLESS TRACK STRUCTURES FOR VEHICLES
Filed Feb. 8, 1952  4 Sheets-Sheet 2

INVENTOR.
Maurice A. Thorne
BY
Willis, Helwig & Baillio
ATTORNEYS

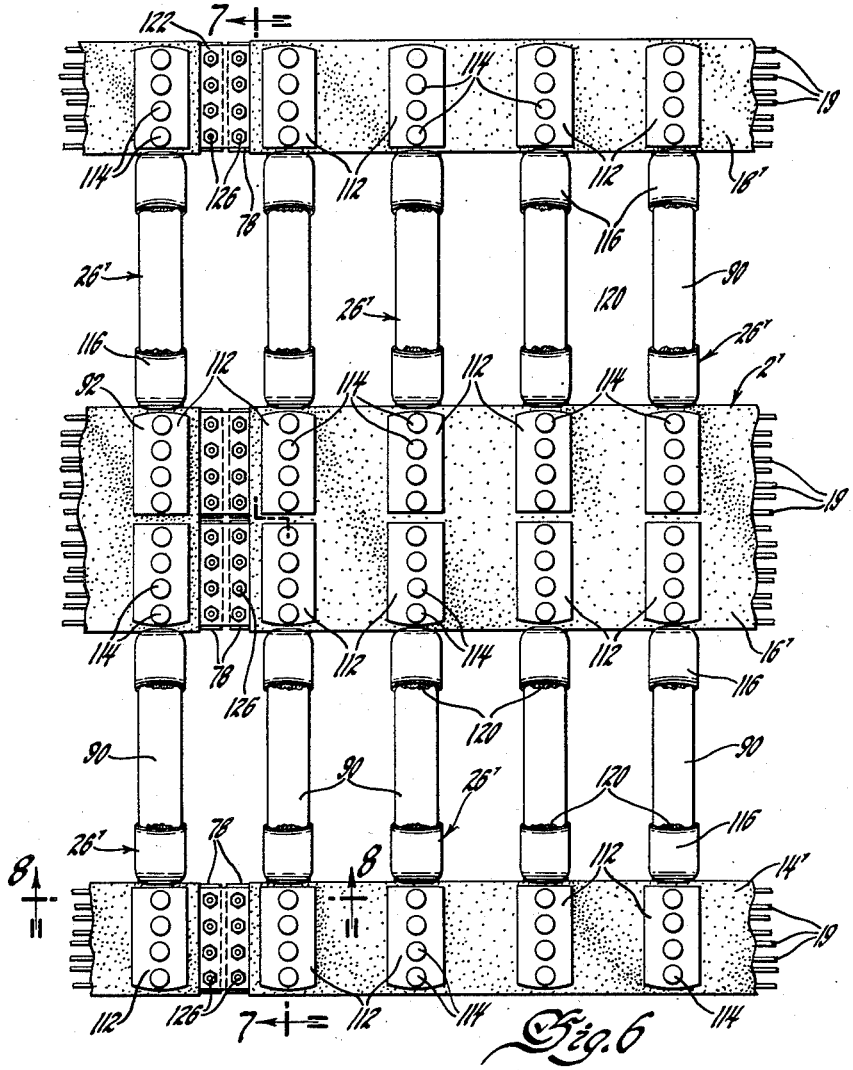
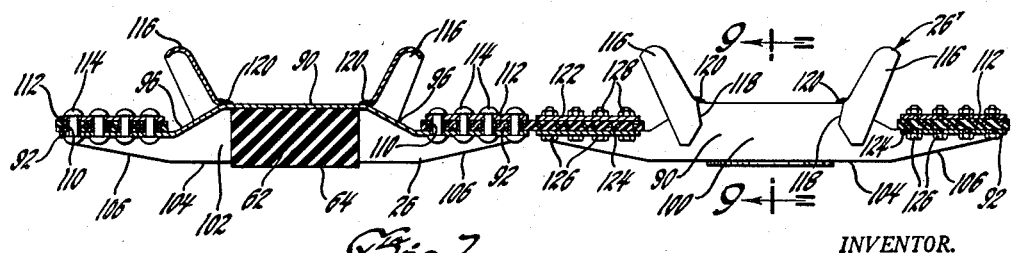

March 26, 1957 M. A. THORNE 2,786,725
ENDLESS TRACK STRUCTURES FOR VEHICLES
Filed Feb. 8, 1952 4 Sheets-Sheet 4
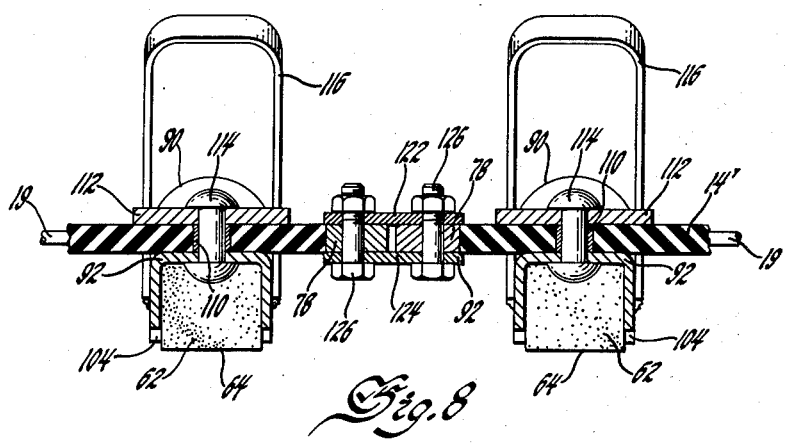
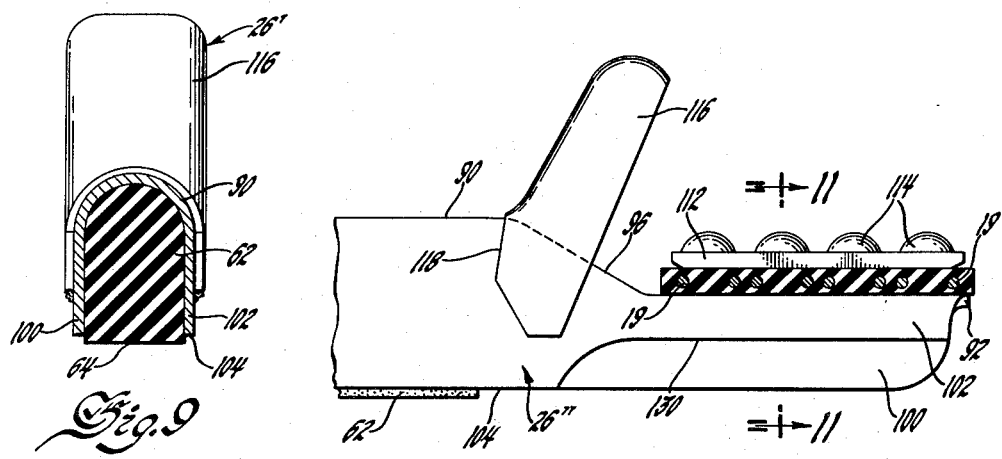
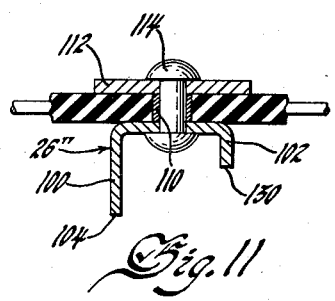
INVENTOR.
Maurice A. Thorne
BY
Willits, Helmig & Baillio
ATTORNEYS

United States Patent Office 2,786,725
Patented Mar. 26, 1957

---

2,786,725

ENDLESS TRACK STRUCTURES FOR VEHICLES

Maurice A. Thorne, Detroit, Mich., assignor to General Motors Corporation, Detroit, Mich., a corporation of Delaware Application February 8, 1952, Serial No. 270,658

12 Claims. (Cl. 305—10)

This invention relates to endless tracks for vehicles, and more particularly to lighter track constructions comprising flexible belting having metallic track bars associated therewith.

In certain types of vehicles employing endless tracks particularly amphibious carriers and other vehicles wherein the weight of the parts is important, the endless tracks associated with such vehicles employed heretofore have been either unduly heavy or if of lighter weight were of generally complicated construction and therefore not only unreliable in operation but expensive in manufacture.

One object of the present invention is to provide an endless track for vehicles which is both light in weight and of highly simplified and serviceable construction.

Another object is to provide in endless track structures of the character described novel cross members which are both simple in construction and highly efficient and durable in operation.

A further object is to provide an endless track for vehicles of the character set forth which may be readily constructed for single or double wheel types of vehicles.

A further object is to provide novel and highly useful cross bars for endless tracks of the stated character which are so constructed that they may be readily assembled on the associated flexible belting.

A further object is to provide cross bars for endless tracks which may be constructed of sheet metal and manufactured in metal forming machines.

A still further object is to provide cross-bars for endless track structures of the character described which are so curved as to most efficiently cooperate with the driving sprockets associated therewith.

Other and further objects will become apparent as the description of the invention progresses.

Of the drawings:

Fig. 1 is a side elevational view, partly in section, of a vehicle having an endless track associated therewith and showing a portion of the operating mechanism for laying said track.

Fig. 2 is a plan view of a portion of the endless track shown in Fig. 1.

Fig. 6 is a plan view similar to Fig. 1 showing a portion of an endless track of a modified construction.

Fig. 7 is a sectional view taken substantially along line 7—7 of Fig. 6.

Fig. 8 is a sectional view taken substantially along line 8—8 of Fig. 6.

Fig. 9 is a sectional view of one of the cross bars taken substantially along line 9—9 of Fig. 7.

Fig. 10 is a fragmentary side elevational view, partly in section, of a cross bar for an endless belt of a further modified construction, and Fig. 11 is a sectional view taken substantially along line 11—11 of Fig. 10.

Figure 3:
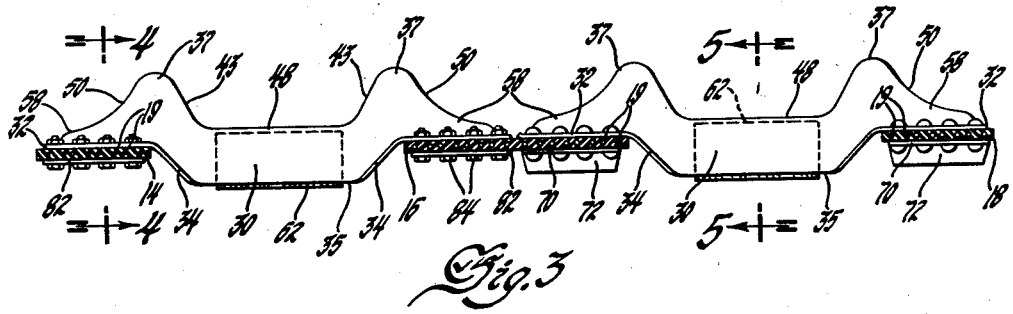
Fig. 3 is a sectional view of the endless track shown in Figs. 1 and 2, said view being taken substantially along line 3—3 of Fig. 2.

Referring to the drawings, the number 1 indicates generally a vehicle having an endless track 2 at either side thereof, only one of which being shown herein. Vehicle 1, for the purpose of illustration, is shown as an amphibious carrier and each track 2 thereof is driven or laid by a sprocket 4 suitably mounted for rotation at one end of the vehicle 1. Each track 2 is also trained over a series of supporting pneumatically tired wheels 6 and also around an idling wheel 8 suitably mounted for rotation at the other end of vehicle 1. The supporting wheels 6 are suspended from the vehicle proper in a well-known manner and engage the upper surface 10 of the lower run 12 of track 2.

Track 2 in the present instance is constructed for operation in connection with a dual wheel structure and consists of spaced flexible belts 14, 16 and 18 and two rows of cross bars 26. The belts 14, 16 and 18 may be constructed of rubber or rubber fabric and each has a series wire reinforcing cables 19 embedded therein and extending longitudinally thereof. The track 2 may be made up into sections secured together by bolts or other means, special cross bars 28 being provided at such joints, as shown in Fig. 2. Each row of cross bars 26 and 28 are so spaced on the flexible belts as to conform with the pitch of the teeth of sprockets 4.

Each cross bar 26 comprises an intermediate portion 30 for engagement by sprocket 4, supporting wheels 6, and idler wheel 8, and end cleat or attaching portions 32. The attaching portions 32 are relatively flat and are provided with two rows of apertures therein for receiving rivets 36 or other securing means for attaching the cross bars 30 to belts 14, 16 and 18. As shown more particularly in Figs. 2 and 3, each cleat or securing portion 32 terminates inwardly in a downwardly inclining flange 34 which extends to the lower edge 35 of intermediate portion 30. Intermediate portion 30 is substantially U-shaped in cross section and is formed with spaced, upwardly projecting lugs or guide members 37 for guiding the sprocket 4, supporting wheels 6, and guide wheel 8 during movement of track 2. Each cross bar 26 is constructed of relatively thin sheet metal and in the present instance is fabricated from two equal sections 38 and 40, the sections being arranged in abutting relation as shown in Figs. 2 and 4 and welded at the seam 42 thereof as indicated at 44.

Figure 4:
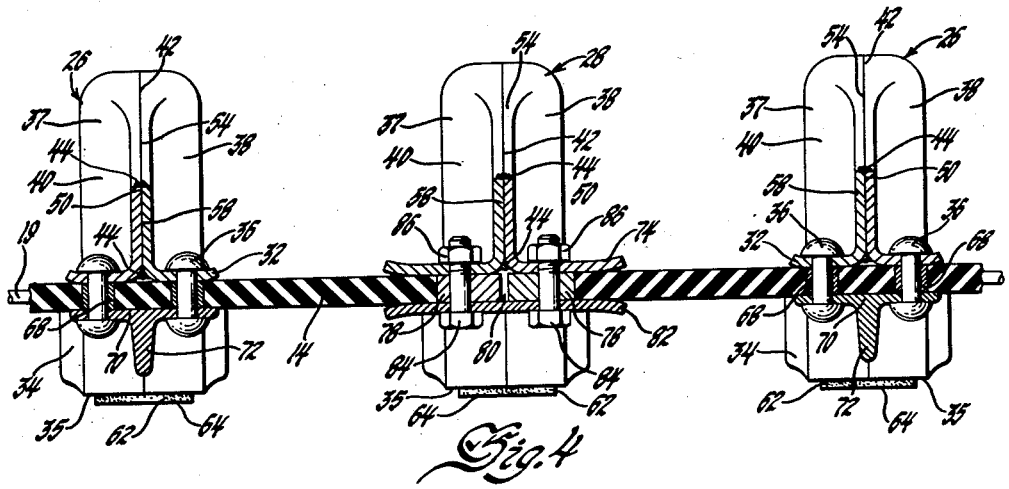
Fig. 4 is a sectional view taken substantially along line 4—4 of Fig. 3.
Figure 5:
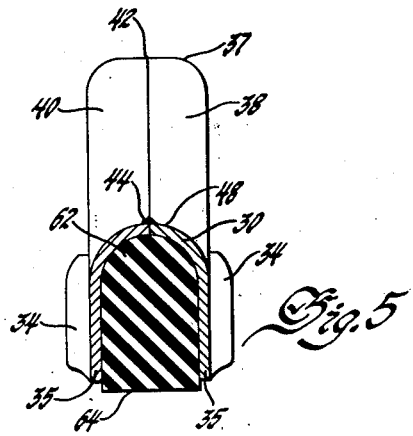
Fig. 5 is a sectional view taken substantially along line 5—5 of Fig. 3.

As shown more particularly in Fig. 3, the raised guide projections 37 are provided with relatively sharply inclining inner walls 43, which terminate at the lower ends thereof in the relatively straight top wall portion 48 of intermediate portion 30. The width of projections 37 and of the downwardly inclining walls 43 thereof, is substantially the same as that of the U-shaped intermediate portion 30. The outwardly extending end portions 50 of projections 37 converge as shown at 54 and terminate in gradually outwardly and downwardly inclining relatively narrow flanges or ribs 58. The ribs 58 being integral with cleats 32 add strength and rigidity thereto. The substantially U-shaped intermediate portion 30 of each cross bar 26 has provided therein a correspondingly shaped solid block of vulcanized rubber. The lower end 64 of block 62 extends below the lower edge 35 of intermediate portion 30 and operates as a tread for the track 2. When the blocks 62 have been inserted in position, as shown in Figs. 3 and 5, they are vulcanized to the intermediate portion 30.

In order to assemble the cross bars 26 on the belts 14, 16, and 18, the said bars are arranged thereon as shown in Fig. 2, the apertures in the cleats 32 being brought into alignment with the bushings 68 inserted in spaced openings provided in the said belts. Securing plates 70 are then placed at the opposite side of the belts, the plates 70 also having two rows of apertures therein which register with the apertures provided in cleats 32. Rivets 36 are then inserted through the openings in cleats 32, bushings 68, and in the opening in plates 70, and secured in the usual manner. To add strength and rigidity thereto, each plate 70 is provided with a central rib 72, as shown more particularly in Figs. 2 and 4.

The cross bars 28 are generally similar in structure to the cross bars 26 just described except that the cleats 74 provided at the opposite ends thereof are somewhat wider than the cleats 32 provided on bars 26. The abutting ends of the sections of belts 14, 16, and 18 have secured thereto in any suitable manner flat apertured securing members 78. In assembly, the belt securing members 78 are brought in end to end relation, a slight space 80 being provided therebetween. The apertures in cleats 74 are then brought into alignment with the apertures in said securing members 78. A complementary securing plate 82 also having apertures therein adapted to register with the apertures provided in securing portion 78 are placed at the opposite side of belts 14, 16, and 18, and bolts 84 are then inserted through these apertures. The nuts 86 on bolts 84 are then tightened and the sections thus are effectively secured in end-to-end relation. The cleats 74 of cross bar 28 and the complementary securing plates 82 are somewhat wider than the cleats 32 of cross bars 26. By this construction the cleats 74 and their complementary bars 82 extend over a portion of the belts 14, 16, and 18 proper beyond the securing portions 78 thereof and provide additional bearing surfaces between the said belts and the cross bars 28 which prevent sharp binding of said belts. This has a tendency to reduce fatigue and provides a highly durable construction. The bars 28 also are comprised of two sections 38 and 40 and have rubber tread blocks 62 vulcanized thereto. The sections 38 and 40 of cross bars 28 are also welded at the seams 42 thereof as shown at 44.

Figs. 6 to 9, inclusive, show another embodiment of the invention. In this construction the cross bars 26' are constructed in a somewhat different fashion from those just described. Each of the cross bars 26' comprises an intermediate portion 90 and end securing or cleat portions 92. The intermediate portion 90 of each cross bar 26' is also substantially U-shaped in cross section, as shown in Fig. 9, and the ends 96 thereof incline downwardly and outwardly and terminate in the relatively flat cleat portions 92. The lower edges 104 of side walls 100 and 102 of intermediate portion 90 are substantially straight over the length thereof and terminate in upwardly inclined bevel portions 106, as shown more particularly in Fig. 7. The inclined portions 106 form side flanges for the flat cleat portions 92 and add strength and rigidity to the structure thereof. Each cleat 92 is provided with a row of apertures which are adapted to align with bushings 110 inserted in spaced apertures provided in the associated belts 14', 16', and 18' of the track structure 2'. Flat, complementary, securing plates 112 having apertures therein adapted to align with the apertures in the cleats 92 are provided for securing the structure in position. To assemble the track structure 2', the cross bars 26' are arranged as shown in Fig. 6, with the cleats 92 thereof disposed beneath the under surface of belts 16', 14' and 18' in alignment with the bushings 110. Securing plates 112 are then placed at the other side of the belts and rivets 114 are then inserted through the aligned apertures and secured in position drawing the cleats 92 and end plates 112 into tight engagement with the belts 16', 14', and 18'.

Intermediate portion 90 of each cross bar 26' has welded at each end thereof, an upwardly extending wheel guide member 116. The guide members 116 are of sheet metal construction and are open at the outer sides thereof being substantially U-shape in cross section. Each of the members 116 is formed with a substantially U-shaped slot 118 at the bottom thereof which corresponds to the shape of cross bar 26' proper. When the members 116 have been arranged as shown in Fig. 7, they are secured in position by welding as indicated at 120. The guide projections 116, while being generally light in weight are nevertheless so constructed as to have considerable strength. The intermediate portion 90 of each cross bar 26' has also vulcanized to the interior thereof a solid rubber tread block 62. The lower end 64 of block 62 extends below the lower edge 104 of intermediate portion 90 and functions as a tread for the track 2'. The cross bars 26' proper are formed from a single piece of sheet metal rather than being constructed in sections as is the case with the bars shown in Figs. 2 to 5. In the track construction shown in Figs. 6 to 9, all the cross bars 26' are of the same construction, no differently constructed bars being employed to secure the sections of the track together.

The opposite ends of each of the sections of belts 14', 16', and 18' have also formed thereon flat securing portions 78 generally similar to the portion 78 previously described. These portions are provided with a series of apertures which are adapted to align with apertures provided in upper and lower securing plates 122 and 124. To assemble the sections in position, the belts 14', 16' and 18' are brought into slightly spaced relation and the plates 122 and 124 are then placed thereon and bolts 126 inserted through the openings. When the nuts 126 are tightened the plates 122 and 124 are drawn tightly into engagement with the portions 78 of the belts.

Figs. 10 and 11 show a slightly modified cross bar construction. Each cross bar 26'' is generally similar to the cross bars 26' just described and consists of an intermediate portion 90 and an attaching cleat 92 at each end thereof. A vertically extending guide projection 116 is also provided at each end of the intermediate portion 90. In the structure shown in Figs. 10 and 11, the lower straight edge 104 of the side wall 100 extends substantially to the outer ends of the cleats 92. The edge 104 of the wall 102 of bar 26'', however, is cut away as shown at 130 over the portion of its length extending beyond intermediate portion 90. This is done to provide a self-cleaning structure. By removing a portion of the flange on one side of the cleats 92 the mud and dirt picked up during operation is automatically removed therefrom as the cross bars pass over the sprockets and idler wheels of the vehicle. Each of the cleats 92 is provided with a single row of apertures similar to those in the cleats 92 of the structure shown in Figs. 6 to 9 and is secured to the belts 14', 16', and 18' by rivets 114 as was done in the latter construction. The sections of the track 21 employing cross bars 26'' are also secured together in the same manner as was done in the track 21 shown in Fig. 6. Each track bar 26'' also has vulcanized to the intermediate portion 90 thereof a rubber tread bar 62.

From the foregoing description it is seen that simplified and highly useful endless tracks have been provided, which are both light in weight and at the same time of strong and durable construction.

While but three embodiments of the invention have been shown and described herein, it will be apparent that other modifications and changes may be made without departing from the spirit of the invention. It therefore is to be understood that it is not intended to limit the invention to the embodiments shown and described herein but only by the scope of the claims which follow.

What is claimed is:

1. And endless track for vehicles comprising, spaced flexible belts and spaced cross bars extending between and secured to said belts, each of said cross bars including an elongated body portion having a rounded intermediate section adapted for engagement by a sprocket wheel or the like, securing cleats extending outward from the ends of each cross bar, a wheel guiding member secured to said body portion at each end of said intermediate section, said guiding members extending upwardly beyond said intermediate section and said cleats, securing plates dissociated from said guiding members, and means for clamping said belts between said securing plates and said cleats.

2. An endless track for vehicles comprising, spaced flexible belts and spaced cross bars extending between and secured to said belts, each of said cross bars comprising an elongated body portion having an intermediate portion of substantially U-shape cross section, a securing cleat extending outward from each end of said intermediate portion, a wheel guiding member formed integral with said body portion near each end of said intermediate portion, said guiding members extending upwardly beyond said intermediate portion and said cleats, securing plates dissociated from said guiding members and means for clamping said belts between said securing plates and said cleats.

3. An endless track for vehicles comprising, spaced flexible belts and spaced cross bars extending between and secured to said belts, each of said cross bars comprising an elongated body portion having an intermediate section substantially U-shape in cross section, a securing cleat extending outward from each end of said body portion, a wheel guiding member welded to said body portion at each end of said intermediate section, said guiding members extending upwardly beyond said intermediate section and said cleats, securing plates dissociated from said guiding members and means clamping said belts between said securing plates and said cleats.

4. An endless track for vehicles comprising, a middle flexible belt and a side flexible belt disposed in spaced substantially parallel relation at either side of said middle belt, a row of spaced substantially parallel cross bars secured to said middle belt and to one of said side belts, a second row of spaced substantially parallel cross bars secured to said middle belt and to the other of said side belts, said cross bars each including an intermediate portion adapted for engagement by a sprocket wheel or the like, securing cleats integral with and extending outwardly from said intermediate portion, wheel guide means secured to each end of said intermediate portion inwardly of said cleats and extending upwardly beyond said intermediate portion and said cleats, and means whereby said belts are clamped to said cleats, said last means comprising securing plates dissociated from said wheel guide means and clamping said belts between said cleats and said securing plates.

5. An endless track for vehicles comprising, a middle flexible belt and a side flexible belt disposed in spaced substantially parallel relation at either side of said middle belt, a row of spaced substantially parallel cross bars secured to said middle belt and to one of said side belts, a second row of spaced substantially parallel cross bars secured to said middle belt and to the other of said side belts with the individual bars in substantial axial alignment with the cross bars of the said first row, said cross bars each including an intermediate portion of rounded conformation adapted to be engaged by a sprocket wheel or the like and further including tread means secured thereto, securing cleats integral with and extending outwardly from said intermediate portion, wheel guide means secured to each end of said intermediate portion inwardly of said cleats and extending upwardly beyond said intermediate portion and said cleats, and means whereby said belts are clamped to said cleats, said last means comprising securing plates dissociated from said wheel guide means.

6. A cross bar for an endless track of pressed metal construction, comprising, an intermediate elongated, substantially U-shape sprocket engaging portion having upper and lower edges, a raised wheel guiding portion formed at each end of said sprocket engaging portion, a relatively flat securing cleat extending outwardly from each of said wheel guiding portions, and downwardly and inwardly extending flange means connecting the inner end of each of said securing cleats with the lower edges of said sprocket engaging portion, each of said wheel guiding portions extending upward beyond said sprocket engaging portion and said cleats and terminating in a relatively narrow vertical rib integral with an adjoining cleat and extending centrally of the latter toward the outer end of said cleat.

7. A sectional cross bar for an endless track of pressed metal construction, comprising, an intermediate elongated substantially U-shape sprocket engaging portion having upper and lower edges, a raised wheel guiding portion formed at each end of said sprocket engaging portion, a relatively flat securing cleat extending outwardly from each of said wheel guiding portions, downwardly and inwardly extending flange means connecting the inner end of each of said securing cleats with the lower edges of said sprocket engaging portion, each of said wheel guiding portions extending upward beyond said sprocket engaging portion and said cleats and terminating in a relatively narrow vertical rib integral with an adjoining cleat and extending centrally of the latter toward the outer end of said cleat, said cross bar being formed in two equal sections, and means for securing said sections together.

8. A pressed metal cross bar for an endless track, comprising, an elongated intermediate substantially U-shaped sprocket engaging portion having upper and lower edges, a relatively flat securing cleat at each end of said cross bar, the said upper edge of said sprocket engaging portion inclining downwardly and outwardly and terminating in said securing cleats, and an upwardly and outwardly extending wheel guide member of substantially U-shape construction welded to said sprocket engaging portion near each end of the latter.

9. A pressed metal cross bar for an endless track, comprising, an elongated intermediate substantially U-shaped sprocket engaging portion having upper and lower edges, a relatively flat securing cleat at each end of said cross bar, the said upper edge of said sprocket engaging portion inclining downwardly and outwardly and terminating in said securing cleats, an upwardly and outwardly extending wheel guide member of substantially U-shape construction welded to said sprocket engaging portion near each end of the latter, and inwardly tapering, downwardly extending flange means on said securing cleats integral with and extending to the lower edges of said sprocket engaging portion.

10. A pressed metal cross bar for an endless track, comprising, an elongated intermediate substantially U-shaped sprocket engaging portion having upper and lower edges, a relatively flat securing cleat at each end of said cross bar, a wheel guide member welded to said sprocket engaging portion near each end of the latter and extending upwardly from said sprocket engaging portion and said cleats, and downwardly extending flange means on each of said securing cleats integral with said sprocket engaging means, portions of one of said flange means being cut away to enable self-cleaning of said cleats.

11. An endless vehicle track comprising spaced flexible belts and spaced cross members extending between said belts, each of said cross members carrying exposed belt-securing cleats, wheel guide means formed integral with said cross members and extending upwardly beyond said cleats, securing plates dissociated from said guide means and means for clamping said belts between said cleats and said securing plates.

12. An endless vehicle track comprising spaced flexible belts and spaced cross members extending between said belts, said cross members carrying exposed belt-securing cleats at the ends thereof, wheel guides secured to said cross members inward of said cleats and extending upwardly beyond said cleats, securing plates dissociated from said wheel guides and said cross members, and means clamping said belts between said cleats and said securing plates.

References Cited in the file of this patent

UNITED STATES PATENTS

| | | |
|---|---|---|
| 1,850,691 | Roberts | Mar. 22, 1932 |
| 1,947,474 | Knox | Feb. 20, 1934 |
| 2,314,295 | Wampfler | Mar. 16, 1943 |
| 2,494,066 | Slemmons | Jan. 10, 1950 |
| 2,515,128 | Lammertse | July 11, 1950 |
| 2,645,532 | Hollenkamp | July 14, 1953 |

FOREIGN PATENTS

| | | |
|---|---|---|
| 450,820 | Great Britain | July 24, 1936 |